Aug. 5, 1952     N. J. POUX     2,606,005

HOT AND COLD PACK

Filed July 31, 1947

INVENTOR.
Noel J. Poux.
BY R. E. Meech
ATTORNEY.

Patented Aug. 5, 1952

2,606,005

UNITED STATES PATENT OFFICE 2,606,005

HOT AND COLD PACK

Noel J. Poux, Meadville, Pa.

Application July 31, 1947, Serial No. 764,962

7 Claims. (Cl. 257—12)

This invention relates to therapeutical devices of the type which are used for treating parts of the human body to remove heat therefrom or to apply heat thereto.

In the present invention, it is proposed to provide such a device comprising a plurality of individual compartments with each having a quantity of a liquid sealed therein. The device is adapted to be placed in a deep freeze unit or other refrigerating apparatus in order to cool or freeze the liquid in the compartments if the device is to be used as an ice pack for withdrawing heat from the body, or is adapted to be placed in boiling water or a suitable heating unit for heating the liquid in the compartments if it is desired to use the device as a hot pack for applying heat to the body.

It is the general object of the present invention to provide an improved therapeutical device which is more flexible than devices of similar character heretofore suggested and used so that the device will easily and readily conform to the part of the body to be treated.

It is another object of the invention to provide such a device which comprises a series of interconnected independent liquid-containing compartments whereby the liquid may be easily and quickly frozen or heated therein, as desired.

It is a more specific object of this invention to provide such a device comprising a plurality of individual link-like members which may be easily and quickly interconnected with one another whereby the device may be conveniently adjusted to any desired length.

It is a further object of the present invention to provide an improved therapeutical device made from a relatively thin, flexible, and impervious material which may be easily and inexpensively manufactured and, at the same time, strong and durable in its construction and efficient and effective in its use.

Various other objects and advantages of this invention will be more apparent in the course of the following specification, and will be particularly pointed out in the appended claims.

In the accompanying drawings, there is shown for the purpose of illustration, an embodiment which my invention may assume in practice.

Figure 1:
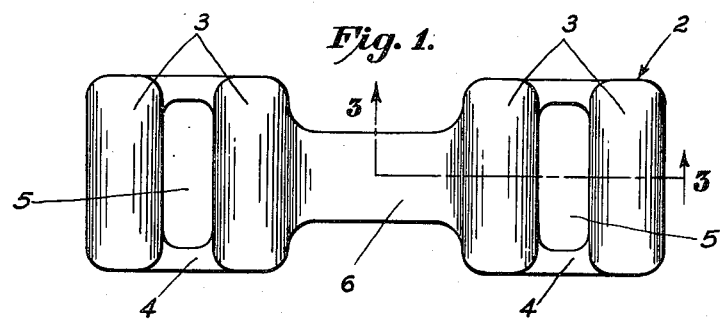
Fig. 1 is a plan view of one of the link members, in open position, employed in the making of the device of the present invention.
Figure 2:
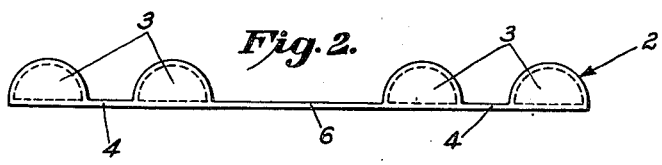
Fig. 2 is a side elevational view of the link member as shown in Fig. 1.

Referring more particularly to the drawings, the improved device of my invention consists of a plurality of link members 2 made from a flexible impervious material such as rubber, but made preferably from one of the synthetic plastic materials such as vinyl, polyvinyl, polyethylene, nylon, acetate, either in sheet or film stock. It has been found that such plastic materials possess the required characteristics for such use. Each of the link members 2 consists of two pairs of semi-cylindrical compartments or cells 3 in which there is permanently sealed a suitable liquid, preferably water. The compartments of each pair are connected together by relatively thin and flat web portions 4 in which there is provided a rectangular-shaped aperture 5, for a purpose hereinafter to be described. The innermost compartments of each pair are interconnected by a relatively narrow and flat central thin portion 6.

Figures 3, 4:
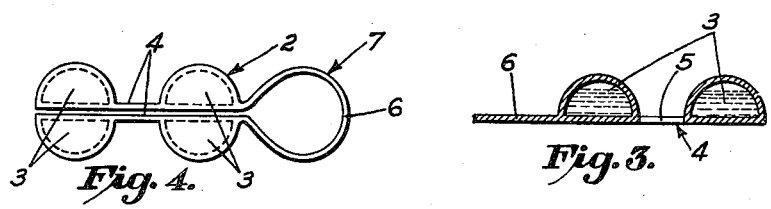
Fig. 3 is a sectional view taken on line 3—3 of Fig. 1.
Fig. 4 is a side elevational view of one of the link members, showing it in its closed or folded position.

Having described the construction of the individual link members, they are assembled in the following manner to provide the completed chain-like device in accordance with the present invention. Initially, one of the link members 2 is folded upon itself so that the one pair of semi-cylindrical compartments or cells 3 complement the other pair to form together two cylindrical-like portions, as shown in Fig. 4. In such folded position, the apertures 5 in each of the web portions 4 between each pair of compartments 3 are in register with one another and the narrow flat thin portion 6 is formed into a loop 7 extending outwardly to one side thereof perpendicular to the axis of the compartments or cells 3. To join the link members together, a pair of the semi-cylindrical compartments of another link member are threaded through the registered apertures 5 of the first link with the narrow flat portion 6 of the second link member looped, as at 7, around the two complementary outermost semi-cylindrical compartments 3 and extending through the registered apertures 5 disposed therebetween, and with the pair of semi-cylindrical compartments of this second link member complementing the other pair thereof in the manner as above described for the first described link member and with the apertures 5 between each pair of the second link in register, as before. The third and each succeeding link member is assembled in the same manner until a device of the desired length is obtained.

Figure 5:
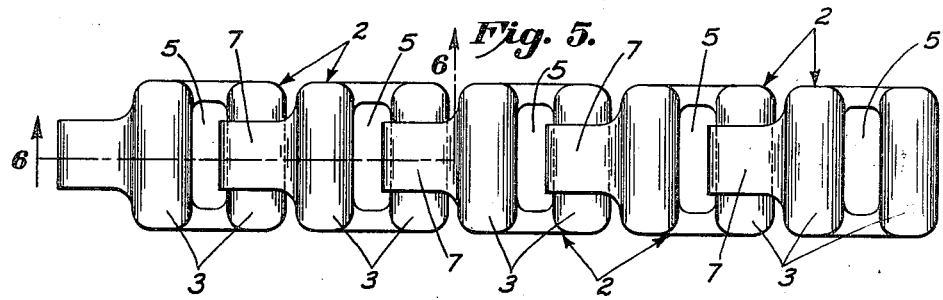
Fig. 5 is a plan view showing a series of link members connected together to form my completed device.
Figure 6:
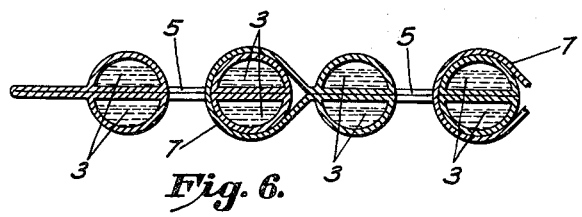
Fig. 6 is a sectional view taken on line 6—6 of Fig. 5.

It will be understood that the loop portion 7 formed by the flat portions 6 when each of the link members is folded upon itself, surrounds the outer two semi-cylindrical compartments of each pair of the preceding link and holds them together, as shown in Figs. 5 and 6, and forms a continuous chain-like device.

It will be seen that link members may be added or removed, as desired, to provide a device of any desired length. In other words, the device may be adjusted to any length merely by supplying additional links or by removing links therefrom.

If the device of my invention is to be used as an ice pack to withdraw heat from the body, the device is placed in a deep freeze unit or refrigerating unit so as to cool or freeze the liquid in each of the compartments 3. The links may be kept separate and assembled together, as described, when the device is to be used or the links may be interconnected beforehand, as desired. If the device is to be used as a hot pack for supplying heat to the body, the device is placed in boiling water or some suitable heating unit until the liquid in the compartments 3 reaches the desired temperature.

It will be seen that one of the main aspects of my invention is that it can be used like a bandage and wrapped around the particular part of the body of the patient to be treated. For example, in the case of a tonsilectomy if it is desired to cool the neck, my device can be made the desired length to fit the patient's neck and wrapped therearound in a most convenient fashion.

As a result of my invention, it will be seen that there is provided an improved therapeutical device made of a series of removable link members which may be easily and quickly connected or disconnected to provide a continuous chain-like device of connected members. It will also be seen that my device is made from relatively light weight material, preferably sheet or film stock, so as to provide a device which is extremely light and flexible in its construction, the link members being so constructed and interconnected as to provide a maximum degree of flexibility between each of them, which is a decided advantage in order that the device will conform easily and readily to any part of the body to be treated.

While I have shown and described one embodiment which my invention may assume in practice, it will be understood that this embodiment is merely for the purpose of illustration and description, and that other forms may be devised within the scope of my invention as defined in the appended claims.

What I claim as my invention is:

1. A therapeutical device comprising a plurality of independent link members made from a flexible impervious material and having a plurality of spaced-apart parallel permanently sealed liquid-containing cells with each being substantially semi-cylindrical in shape, each of said link members having an aperture arranged therein between at least two of said cells and folded upon itself so that said two cells of each link are disposed opposite each other and complement one another to provide a cylindrical portion with the apertures between the cells in register with one another, a loop-like portion formed at one end of each of said link members when folded upon themselves, the loop portion of each of said link members being disposed around two of the complementary cells of the next succeeding link member and extending through the apertures thereof so as to provide a continuous chain-like device of connected members.

2. A therapeutical device comprising a plurality of link members made from a flexible impervious material and having two pairs of spaced-apart parallel permanently sealed liquid-containing cells with each being substantially semi-cylindrical in shape, each of said link members having an aperture arranged therein between the cells of each pair and folded upon itself so that the cells of each pair are disposed opposite each other and complement one another to provide a cylindrical portion with the apertures between the cells in registry with one another, the pairs of each link being connected by a relatively narrow flat portion which forms a loop-like portion when each link member is folded upon itself with the loop portion of each disposed around the outer two of the complementary cells of the next succeeding link member and extending through the apertures thereof so as to provide a continuous chain-like device of connected members.

3. A link member for a therapeutical device made from a flexible material comprising two groups of spaced-apart permanently sealed liquid-containing cells connected by a relatively narrow thin flat portion, each of said groups having an aperture arranged in the material between at least two of the cells thereof, said groups being adapted to be folded upon one another at said flat portion to form a link member with the apertures in register with one another.

4. A link member for a therapeutical device made from a flexible material comprising two pairs of spaced-apart parallel permanently sealed liquid-containing cells with each being substantially semi-cylindrical in shape, a relatively narrow and flat portion connecting said pairs of cells, each of said pairs having an aperture arranged in the material between the cells thereof, said pairs of cells being adapted to be disposed opposite one another with the apertures in register and the cells complementing one another to provide a pair of substantially cylindrical portions with the flat portion adapted to form a loop when so folded.

5. A therapeutical device comprising a plurality of independent link members having at least one permanently sealed liquid-containing cell arranged with each of said link members, each of said link members having an aperture arranged therein to one side of said cell, a loop-like portion arranged on the opposite side of said cell with the loop-like portion of one member adapted to extend through the aperture and around the material of said link member of the next succeeding link member so as to provide a continuous chain-like device of connected members.

6. A therapeutical device comprising a plurality of independent link members having at least a pair of complementary permanently sealed liquid-containing cells arranged with each of said link members, each of said link members having an aperture arranged therein to one side of said complementary cells, a loop-like portion formed on the opposite side of said cells when each of the link members is folded upon itself, each of said link members adapted to be folded upon itself with the loop portion of each of said link members extending through the aperture and disposed around the two complementary cells of the next succeeding link members so as to provide a continuous chain-like device of connected members.

7. A therapeutical device comprising a plurality of independent link members having at least two pairs of complementary permanently sealed liquid-containing cells arranged with each of said link members, each of said link members, each of said link members having an aperture arranged therein between each pair of cells and adapted to be folded upon itself so that the two pairs of cells are disposed opposite each other and complement one another with the apertures between the cells in register with one another, a loop-like portion formed at one end of each of said link members when folded upon themselves with the loop portion of the respective link members being disposed around two of the complementary cells of the next succeeding link member and extending through the apertures thereof so as to provide a continuous chain-like device of connected members.

NOEL J. POUX.

REFERENCES CITED

The following references are of record in the file of this patent:

UNITED STATES PATENTS

| Number | Name | Date |
|---|---|---|
| 370,239 | Brombacher | Sept. 20, 1887 |
| 699,778 | Upham | May 13, 1902 |
| 747,634 | Peterson | Dec. 22, 1903 |
| 1,159,160 | Beringer | Nov. 2, 1915 |
| 1,607,626 | Hopkinson | Nov. 23, 1926 |
| 2,011,832 | Slater | Aug. 20, 1935 |
| 2,101,628 | Padelford | Dec. 7, 1937 |
| 2,203,591 | Brown | June 4, 1940 |
| 2,237,971 | Padelford | Apr. 8, 1941 |

FOREIGN PATENTS

| Number | Country | Date |
|---|---|---|
| 214,584 | Switzerland | Sept. 16, 1941 |